United States Patent
Liao et al.

(10) Patent No.: US 10,231,228 B2
(45) Date of Patent: Mar. 12, 2019

(54) METHODS OF TWO-STAGE SCHEDULING IN DOWNLINK CONTROL CHANNEL

(71) Applicant: MEDIATEK INC., Hsinchu (TW)

(72) Inventors: Pei-Kai Liao, Nantou County (TW); Yi-Ju Liao, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/712,297

(22) Filed: Sep. 22, 2017

(65) Prior Publication Data

US 2018/0092070 A1 Mar. 29, 2018

Related U.S. Application Data

(60) Provisional application No. 62/398,553, filed on Sep. 23, 2016, provisional application No. 62/417,377, filed on Nov. 4, 2016.

(51) Int. Cl.
*H04W 4/00* (2018.01)
*H04W 72/04* (2009.01)
(Continued)

(52) U.S. Cl.
CPC ......... *H04W 72/042* (2013.01); *H04L 1/0038* (2013.01); *H04W 72/121* (2013.01);
(Continued)

(58) Field of Classification Search
CPC ............. H04W 72/042; H04W 72/121; H04W 72/0446; H04L 1/0038; H04L 1/0039; H04L 5/005
(Continued)

(56) References Cited

U.S. PATENT DOCUMENTS

2011/0019776 A1* 1/2011 Zhang ................... H04L 5/0023
375/340
2012/0009923 A1 1/2012 Chen et al. ................... 455/434
(Continued)

FOREIGN PATENT DOCUMENTS

| CN | 102186251 A | 4/2011 |
| CN | 103535097 A | 5/2011 |

(Continued)

OTHER PUBLICATIONS

International Search Report and Written Opinion of International Search Authority for PCT/CN2017/103148 dated Dec. 28, 2017 (11 pages).

(Continued)

*Primary Examiner* — Amancio Gonzalez
(74) *Attorney, Agent, or Firm* — Imperium Patent Works; Zheng Jin

(57) ABSTRACT

A method of two-stage scheduling in downlink control channel is proposed to enhance downlink control information (DCI) forward compatibility and hardware flexibility. The DCI comprises a basic DCI and an extended DCI. The basic DCI provides basic scheduling information of the scheduled data. The extended DCI provides extended scheduling information of the scheduled data channel. The basic DCI can be unicast to a single UE over UE-specific search space. The basic DCI can also be broadcast or multicast to a group of UEs over common search space. UE performs blind detection of the basic DCI only, while the location and size of the extended DCI can be provided by the basic DCI or provided by a higher layer signaling. Cross-slot/subframe and Multi-slot/subframe scheduling can also be applied in the two-stage scheduling.

22 Claims, 5 Drawing Sheets

(51) Int. Cl.
*H04L 1/00* (2006.01)
*H04W 72/12* (2009.01)
*H04L 5/00* (2006.01)

(52) U.S. Cl.
CPC ............ *H04L 1/0039* (2013.01); *H04L 5/005* (2013.01); *H04W 72/0446* (2013.01)

(58) Field of Classification Search
USPC .......................................................... 370/328
See application file for complete search history.

(56) References Cited

U.S. PATENT DOCUMENTS

| | | | |
|---|---|---|---|
| 2014/0086202 A1 | 3/2014 | Nagata et al. | 370/330 |
| 2014/0161082 A1* | 6/2014 | Gao | H04W 72/1263 370/329 |
| 2014/0169312 A1 | 6/2014 | Wang et al. | 379/329 |
| 2014/0307694 A1* | 10/2014 | Zeng | H04W 72/042 370/329 |
| 2017/0079065 A1* | 3/2017 | Lyu | H04W 72/04 |

FOREIGN PATENT DOCUMENTS

| | | |
|---|---|---|
| CN | 102958184 A | 8/2011 |
| WO | WO2011090688 A2 | 12/2009 |

OTHER PUBLICATIONS

3GPP TSG RAN1 #56bis R1-091327, Motorola, "Common PDCCH Design for Carrier Aggregation", Seoul, Korea, Mar. 23-27, 2009 (2 pages).

\* cited by examiner

METHODS OF TWO-STAGE SCHEDULING IN DOWNLINK CONTROL CHANNEL

CROSS REFERENCE TO RELATED APPLICATIONS

This application claims priority under 35 U.S.C. § 119 from U.S. Provisional Application No. 62/398,553, entitled "Methods of 2-Stage Scheduling in Downlink Control Channel," filed on Sep. 23, 2016; U.S. Provisional Application No. 62/417,377, entitled "Methods of 2-Stage Scheduling in Downlink Control Channel," filed on Nov. 4, 2016, the subject matter of which is incorporated herein by reference.

TECHNICAL FIELD

The present invention relates generally to wireless communication systems and, more particularly, to two-stage scheduling in downlink control channel.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI).

The DCI format is a predefined format in which the downlink control information is formed and transmitted in PDCCH. The DCI format gives the UE details such as number of resource blocks, resource allocation type, modulation scheme, transport block, redundancy version, coding rate etc. Different DCI formats are defined in LTE to support different transmission schemes. For example, DCIs can have six formats: one format for UL scheduling, two formats for non-MIMO DL scheduling, one format for MIMO DL scheduling, and two formats for UL power control. When a new feature is introduced, new DCI format may be defined and the DCI size may change accordingly. For example, for UE with one Hybrid automatic repeat request (HARQ) process there is no field in DCI to indicate HARQ process number. However, to support more than one HARQ processes, the field in DCI to indicate HARQ process number is needed such that the UE knows which HARQ process the scheduled grant belongs to. In another example, a UE with larger bandwidth may need more bits for resource allocation, which results in a different DCI format/size.

In LTE, single-step DL/UL data scheduling is adopted. Each UE needs to blindly decode PDCCH over specified search spaces within a single step. This has a few disadvantages. First, it has poor DCI forward compatibility because the size of DCI is specified. When a new feature is introduced with DCI changes, it introduces large specification impact on DCI size determination and UE blind detection behavior. Second, it has poor hardware flexibility because the DCI size is usually hardware-coded for fast DCI decoding. When a new feature is introduced with DCI changes, it introduces large hardware impact. A solution is sought to enhance DCI forward compatibility and hardware flexibility.

SUMMARY

A method of two-stage scheduling in downlink control channel is proposed to enhance downlink control information (DCI) forward compatibility and hardware flexibility. The DCI comprises a basic DCI and an extended DCI. The basic DCI provides basic scheduling information, e.g., resource allocation information of the scheduled data channel, wideband scheduling information, and information related to the extended DCI configuration. The extended DCI provides extended scheduling information of the scheduled data channel, e.g., transmission scheme for the scheduled data, indication of SU/MU-MIMO for the scheduled data, assistance information for interference cancellation, and subband scheduling information. The basic DCI can be unicast to a single UE over UE-specific search space. The basic DCI can also be broadcast or multicast to a group of UEs over common search space. UE performs blind detection of the basic DCI only, while the location and size of the extended DCI can be provided by the basic DCI or provided by a higher layer signaling. Cross-slot/subframe and Multi-slot/subframe scheduling can also be applied in the two-stage scheduling. The two-stage scheduling reduces UE decoding complexity for blind detection of basic DCI, enables forward compatibility, and enables subband-specific scheduling via extended DCI.

In one embodiment, a UE monitors a basic downlink control information (DCI) over a physical layer signaling from a base station in a mobile communication network. The UE decodes the basic DCI having a predefined basic DCI size using blind detection. The basic DCI carries basic scheduling information and location information of an extended DCI. The UE monitors the extended DCI over the physical layer signaling using the location information of the extended DCI provided by the basic DCI. The UE decodes the extended DCI. The extended DCI carries extended scheduling information.

In another embodiment, the base station transmits a higher layer signaling to a user equipment (UE) in a mobile communication network. The base station transmits a basic downlink control information (DCI) over a physical layer signaling. The basic DCI comprises at least one of a resource allocation type and resource allocation information for scheduled data. The basic DCI further comprises location information of an extended DCI. The base station transmits an extended DCI over the physical layer signaling. The extended DCI comprises at least one of a modulation order, a code rate, a multi-antenna scheme, a pilot configuration, and assistance information for interference cancellation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
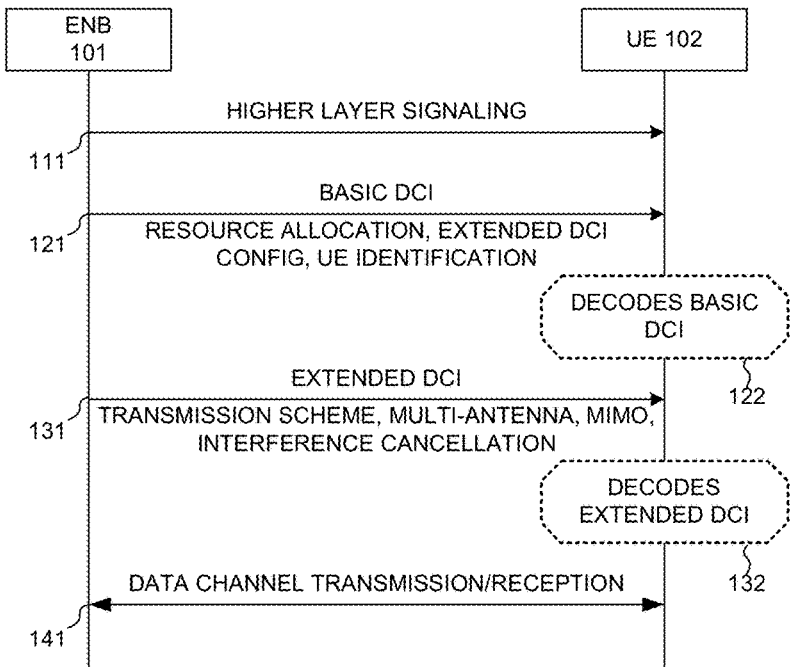
FIG. 1 illustrates a method of two-stage scheduling in downlink control channel in accordance with one novel aspect.

FIG. 1 illustrates a method of two-stage scheduling in downlink control channel in a mobile communication network in accordance with one novel aspect. The mobile communication network comprises a serving base station eNB 101 and a plurality of user equipments including UE 102. In LTE networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. The DCI format gives the UE details such as number of resource blocks, resource allocation type, modulation scheme, transport block, redundancy version, coding rate etc. Different DCI formats are defined in LTE to support different transmission schemes. When a new feature is introduced, new DCI format may be defined with different DCI size.

In LTE, single-step DL/UL data scheduling is adopted. Each UE needs to blindly decode PDCCH over specified search spaces within a single step, which results in poor DCI forward compatibility and poor hardware flexibility. In accordance with one novel aspect, a two-stage scheduling method in downlink control channel is proposed to enhance DCI forward compatibility and hardware flexibility. In essence, DCI comprises a basic DCI and an extended DCI. The basic DCI provides basic scheduling information, e.g., resource allocation information of the scheduled data channel, wideband scheduling information, and information related to the extended DCI configuration. The extended DCI provides extended scheduling information of the scheduled data channel, e.g., assistance information for interference cancellation, subband scheduling information. UE performs blind detection of the basic DCI only, while the location and size of the extended DCI can be provided by the basic DCI or provided by a higher layer signaling.

In the example of FIG. 1, in step 111, eNB 101 transmits a higher layer signaling to UE 102. The higher layer signaling may be a radio resource control (RRC) message that semi-statically configures parameters related to the two-stage downlink control scheduling. In step 121, eNB 101 transmits the basic DCI via physical layer signaling to UE 102. The basic DCI includes all or a subset of resource allocation information and transmission configuration of the extended DCI. In step 122, UE 102 decodes the basic DCI using blind decoding and its scheduling identification. UE 102 also obtains location information of the extended DCI. In step 131, eNB 101 transmits the extended DCI via physical layer signaling to UE 102. The extended DCI includes all or a subset of modulation order, code rate, multi-antenna schemes, configuration of demodulation pilots, MIMO, and assistance information for interference cancellation. In step 132, UE 102 decodes the extended DCI using the location information obtained from the basic DCI. Finally, in step 141, UE 102 performs uplink data transmission or downlink data reception over the scheduled data channel based on both the basic DCI and the extended DCI.

Figure 2:
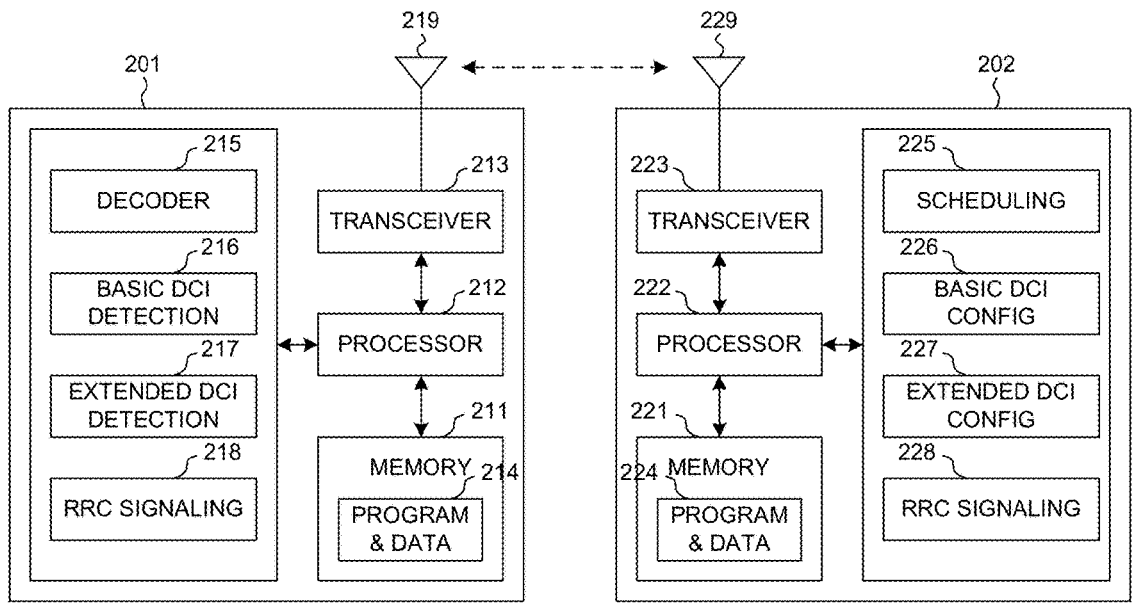
FIG. 2 is a simplified block diagram of a user equipment and a base station that carry embodiments of the present invention.

FIG. 2 is a simplified block diagram of a user equipment UE 201 and a base station eNB 202 that carry embodiments of the present invention. UE 201 comprises memory 211, a processor 212, an RF transceiver 213, and an antenna 219. RF transceiver 213, coupled with antenna 219, receives RF signals from antenna 219, converts them to baseband signals and sends them to processor 212. RF transceiver 213 also converts received baseband signals from processor 212, converts them to RF signals, and sends out to antenna 219. Processor 212 processes the received baseband signals and invokes different functional modules and circuits to perform features in UE 201. Memory 211 stores program instructions and data 214 to control the operations of UE 201. The program instructions and data 214, when executed by processor 212, enables UE 201 to receive higher layer and physical layer configuration for 2-stage scheduling.

Similarly, eNB 202 comprises memory 321, a processor 222, an RF transceiver 223, and an antenna 229. RF transceiver 223, coupled with antenna 229, receives RF signals from antenna 229, converts them to baseband signals and sends them to processor 222. RF transceiver 223 also converts received baseband signals from processor 222, converts them to RF signals, and sends out to antenna 229. Processor 222 processes the received baseband signals and invokes different functional modules and circuits to perform features in eNB 202. Memory 221 stores program instructions and data 224 to control the operations of eNB 202. The program instructions and data 224, when executed by processor 222, enables eNB 202 to configure via higher layer and physical layer signaling of basic DCI and extended DCI scheduling.

UE 201 and eNB 202 also comprise various function modules and circuits that can be implemented and configured in a combination of hardware circuits and firmware/software codes being executable by processors 212 and 222 to perform the desired functions. Each functional module or circuit may comprise a processor together with corresponding program codes. In one example, UE 201 comprises a decoder 215 that decodes the content of the detected basic DCI and extended DCI, a basic DCI detection circuit 216 that monitors and detects basic DCI via blind detection, an extended DCI detection circuit 217 that monitors and detects extended DCI using location information obtained from basic DCI, and an RRC configuration circuit 218 for receiving higher layer DCI parameters. Similarly, eNB 202 comprises a scheduling module 225 that provides downlink scheduling and uplink grant, a basic DCI configurator 226 that provides basic scheduling information over physical layer signaling, an extended DCI configurator 227 that provides extended scheduling information over physical layer signaling, and an RRC configuration circuit 228 for providing higher layer DCI parameters.

Figure 3:
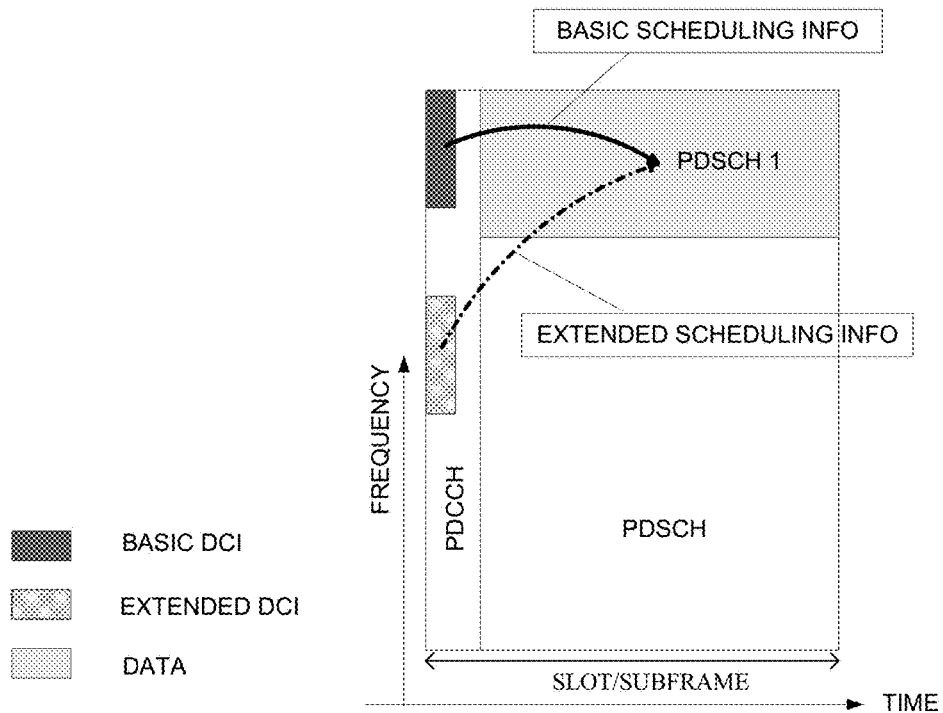
FIG. 3 illustrates a first embodiment of basic DCI and extended DCI.

FIG. 3 illustrates a first embodiment of basic DCI and extended DCI. As depicted in FIG. 3, the DL radio resource is divided into a PDCCH region for control channel and a PDSCH for data channel. For example, PDCCH can be configured to occupy the first one, two, or three OFDM symbols in a slot/subframe. In the example of FIG. 3, both basic DCI and extended DCI is located in the PDCCH region. The basic DCI carries basic scheduling information including: radio resource allocation type for the scheduled data of PDSCH 1 (e.g., localized or distributed PRBs), radio resource allocation for the scheduled data (e.g., PRBs), configuration of the extended DCI (e.g., location, size, modulation order), and scheduling identification (e.g., RNTI in LTE). The extended DCI carries extended scheduling information including: transmission scheme for the scheduled data of PDSCH 1 (e.g., modulation order, code rate, multi-antenna schemes and applied dedicated pilots), indication of single-user or multi-user MIMO for the scheduled data, and assistance information for interference cancellation.

Figure 4:
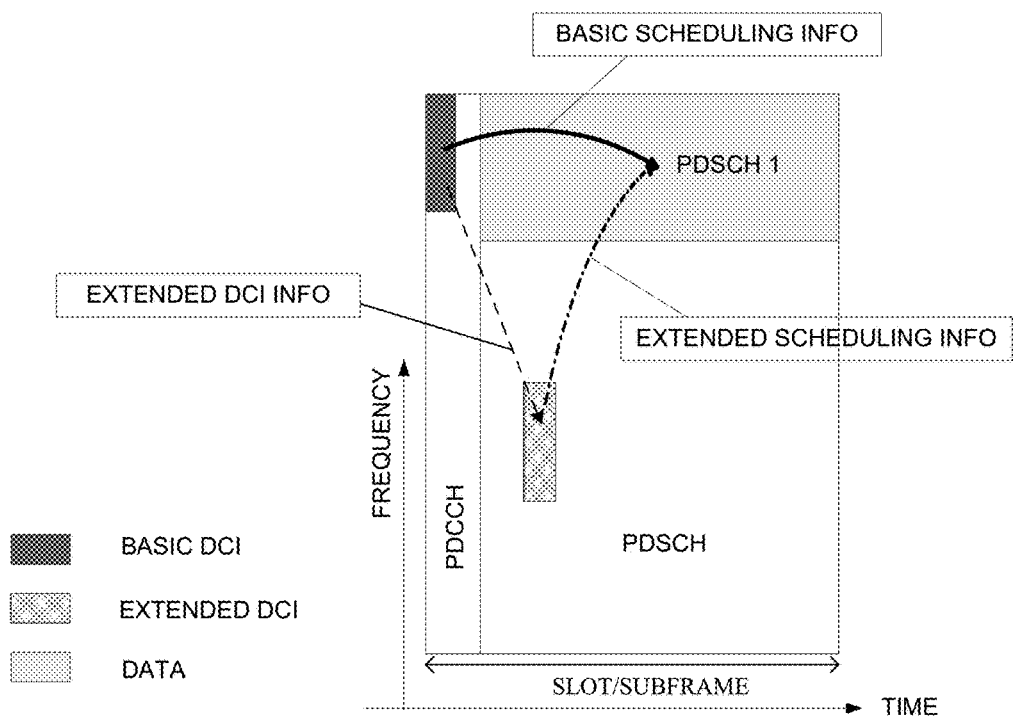
FIG. 4 illustrates a second embodiment of basic DCI and extended DCI.

FIG. 4 illustrates a second embodiment of basic DCI and extended DCI. As depicted in FIG. 4, the DL radio resource is divided into a PDCCH region for control channel and a PDSCH for data channel. For example, PDCCH can be configured to occupy the first one, two, or three OFDM symbols in a slot/subframe. In the example of FIG. 4, the basic DCI is located in the PDCCH region, while the extended DCI is located in the PDSCH region. When UE decodes the basic DCI, the UE determines the location and the size of the extended DCI based on the location of the basic DCI, the signaling in the basic DCI, or combination of the previous two options. Due to the issue of downlink control capacity, the main benefits to have extended DCI inside the region of PDSCH are for better support of HetNet, CoMP, and MU-MIMO.

The two-stage scheduling reduces UE decoding complexity for blind detection. UE blindly decodes the basic DCI only, which has simplified DCI format types and predefined DCI size. The extended DCI does not need to be blindly decoded. The two-stage scheduling also enables forward compatibility. New transmission scheme does not require new DCI formats for the basic DCI, and new physical layer signaling does not require changes in the basic DCI formats. The two-stage scheduling further enables subband-specific scheduling for UE via the extended DCI, which provides subband-specific modulation order, SU/MU-MIMO operation per subband, interference cancellation operation switch per subband.

There are two options for the transmission of the basic DCI by the base station. In a first option #1, the base station unicasts the basic DCI to each UE. A single basic DCI carries the basic scheduling information for one specific UE only. The unicast basic DCI is transmitted over UE-specific search space within PDCCH. The scheduling identification carried by the basic DCI is UE-specific. There could be single or multiple extended DCIs associated with the single basic DCI. Under option #1, the scheduling overhead can be adjusted dynamically based on the number of scheduled UEs.

In a second option #2, the base station broadcasts or multicasts the basic DCI to a group of UEs. A single basic DCI carries the basic scheduling information for all or multiple UEs (e.g., four UEs). The broadcast/multicast basic DCI is transmitted over common search space within PDCCH. The scheduling identification carried by the basic DCI is UE-group-specific. The scheduling information for each UE is arranged based on 1) UE identification (e.g., C-RNTI in LTE); 2) higher layer signaling; or 3) UE identification and higher layer signaling. There are multiple extended DCIs associated with the single basic DCI. Under option #2, higher channel coding gain can be exploited due to larger DCI size, and less overhead for CRC bits is required.

Figure 5:
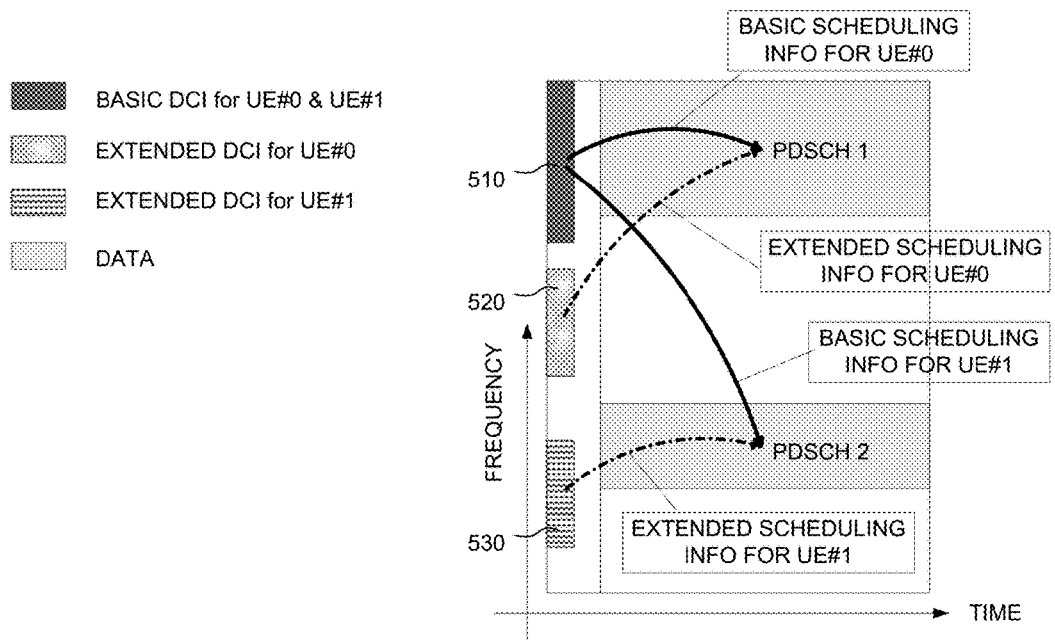
FIG. 5 illustrates one embodiment of broadcast or multicast basic DCI.

FIG. 5 illustrates one embodiment of broadcast or multicast basic DCI. In the embodiment of FIG. 5, the base station broadcasts or multicasts the basic DCI 510 to UE#0 and UE#1. The basic DCI 510 provides basic scheduling information for UE#0 of the scheduled data PDSCH1. The basic DCI 510 also provides basic scheduling information for UE#1 of the scheduled data PDSCH2. Basic DCI 510 is associated with two extended DCIs—extended DCI 520 for UE#0 and extended DCI 530 for UE#1. Extended DCI 520 provides extended scheduling information for UE#0 of the scheduled data PDSCH1. Extended DCI 530 provides extended scheduling information for UE#1 of the scheduled data PDSCH2.

Under the two-stage scheduling, a UE performs blind detection for basic DCI over a predefined candidate location (i.e., search space). There are CRC bits for a UE to filter out the false detections. By default, the UE monist unicast basic DCI. However, the UE can be configured to monitor multicast/broadcast basic DCI additionally. In one example, when a UE is configured to monitor multicast basic DCI to a group of UEs, the group scheduling identification is signaled to the UE by higher layer signaling. The UE then performs blind detection for the multicast basic DCI over common search space and the UE also performs blind detection for the unicast basic DCI over UE-specific search space.

UE blind detection is only needed for basic DCI, no UE blind detection is needed for extended DCI. For unicast basic DCI, the location of the extended DCI can be determined by the UE using the following methods: 1) based on the location of the associated basic DCI; 2) based on the signaling content in the associated basic DCI; 3) based on the signaling content in the higher-layer configuration; 4) based on the location of the associated basic DCI and the signaling content in the associated basic DCI; 5) based on the location of the associated basic DCI and the higher layer configuration; 6) based on the higher layer configuration and the signaling in the associated basic DCI; 7) based on the location of the associated basic DCI, the higher layer configuration, and the signaling in the associated basic DCI.

Similarly, for multicast/broadcast basic DCI, the location of the extended DCI can be determined by the UE using the following methods: 1) based on the location of the associated basic DCI; 2) based on the signaling content in the associated basic DCI; 3) based on the signaling content in the higher-layer configuration; 4) based on the location of the associated basic DCI and the signaling content in the associated basic DCI; 5) based on the location of the associated basic DCI and the higher layer configuration; 6) based on the higher layer configuration and the signaling content in the associated basic DCI; 7) based on the location of the associated basic DCI, the higher layer configuration, and the signaling content in the associated basic DCI.

The extended DCI size can be signaled to a UE by higher layer signaling, e.g., transmission scheme configuration, explicit size configuration. The extended DCI can be modulated with one of multiple modulation orders, e.g., QPSK or 16 QAM, which can be provided by the basic DCI. UE can perform false detection filtering of extended DCI. In one example, UE can use CRC bits within an extended DCI to filter out the false detections. In another example, UE can perform a few checking bits with predefined values (e.g., 00, 11) to filter out the false detection. The extended DCI can carry subband-specific scheduling information for multiple subbands.

Figure 6:
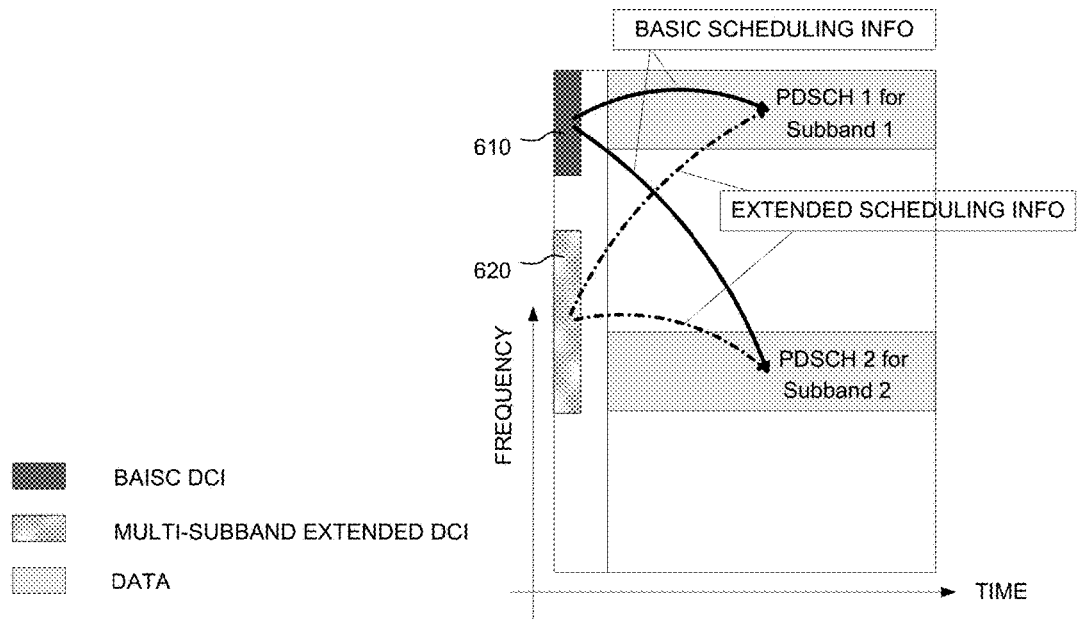
FIG. 6 illustrates one embodiment of multi-subband extended DCI.

FIG. 6 illustrates one embodiment of multi-subband extended DCI. In the embodiment of FIG. 6, the base station unicasts the basic DCI 610 to a UE. Basic DCI 610 provides basic scheduling information of the scheduled data PDSCH 1 for subband 1 and PDSCH 2 for subband 2. For example, the basic DCI provides resource allocation type and resource allocation PRBs for each subband. Basic DCI 610 is associated with an extended DCI 620 for the UE. Extended DCI 620 provides extended scheduling information of the scheduled data PDSCH 1 for subband 1 and PDSCH 2 for subband 2. For example, the extended DCI 620 provides subband-specific modulation order, SU/MU-MIMO operation per subband, and interference cancellation operation switch per subband.

In LTE, user equipments and base stations communicate with each other by sending and receiving data carried in radio signals according to a predefined radio frame format. Typically, the radio frame format contains a sequence of radio frames, each radio frame comprises a number of subframes, which further comprises a number of slots. In 4G networks, the basic scheduling time unit in physical layer is referred to as a subframe. In next generation 5G networks, the basic scheduling time unit in physical layer is referred to as a slot, and each radio frame comprises a plurality of slots. In addition to same slot/subframe scheduling, cross slot/subframe scheduling and multi-slot/subframe scheduling can be configured and applied to the two-stage scheduling method.

Figure 7:
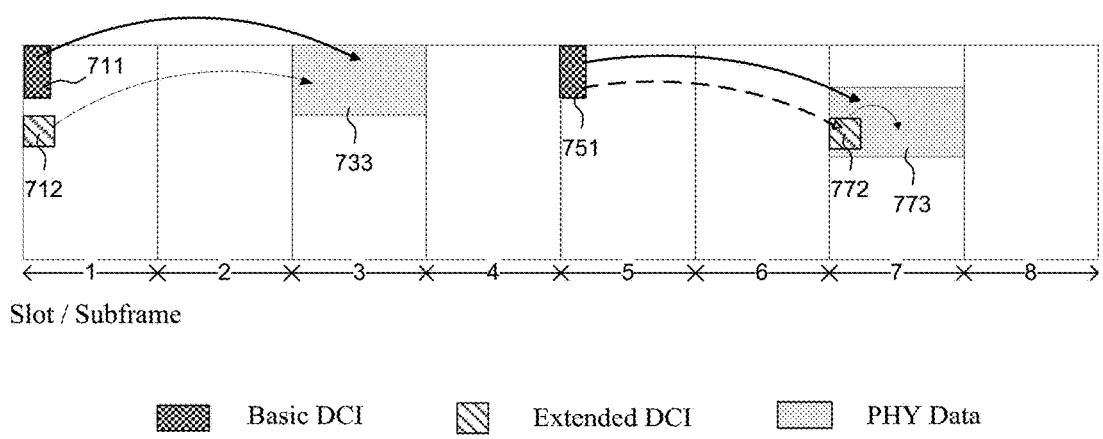
FIG. 7 illustrates one embodiment of cross-slot/subframe scheduling.

FIG. 7 illustrates one embodiment of cross-slot/subframe scheduling. FIG. 7 depicts a radio frame having 8 slots/subframes 1-8. In cross-slot scheduling, a control channel in one slot schedules a data channel in another slot. The cross-slot/subframe scheduling is configured by higher layer, and can be applied to basic DCI. For example, if a UE is configured to apply cross-slot/subframe scheduling for basic DCI, then the UE monitors the basic DCI in slot/subframe N for the scheduled data in slot/subframe N+K, where K>=1. The UE monitors the extended DCI in slot/subframe N for the scheduled data in slot/subframe N. The cross-slot/subframe scheduling can be applied to both unicast basic DCI and broadcast/multicast basic DCI.

In a first example, in slot/subframe 1, a serving base station transmits both basic DCI 711 and extended DCI 712 to a UE. The basic DCI 711 provides basic scheduling information for scheduled data channel PDSCH 733 in slot 3. The extended DCI 712 provides extended scheduling information for the scheduled data channel PDSCH 733 in slot 3. In a second example, in slot/subframe 5, the base station transmits basic DCI 751 to the UE. The basic DCI 751 provides basic scheduling information for scheduled data channel PDSCH 773 in slot 7. The base station transmits extended DCI 772 in slot 7 to provide extended scheduling information for the scheduled PDSCH 773 in slot 7. The location of extended DCI 772 is carried in the basic DCI 751.

Figure 8:
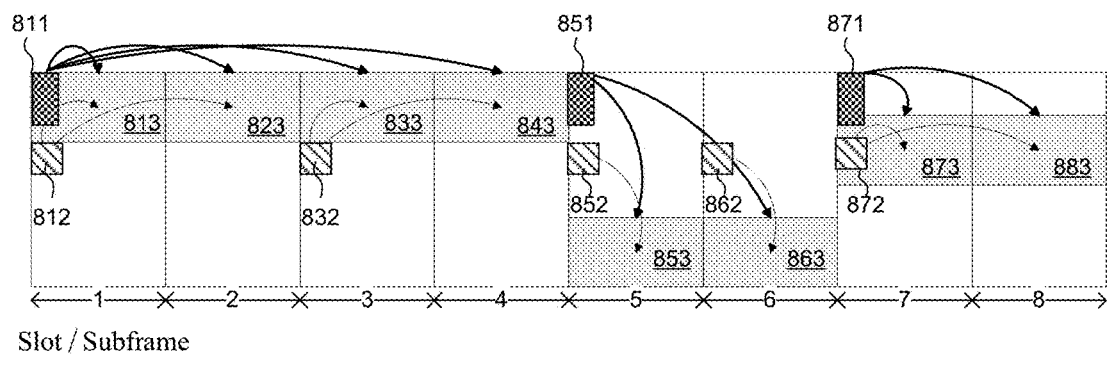
FIG. 8 illustrates one embodiment of multi-slot/subframe scheduling.

FIG. 8 illustrates one embodiment of multi-slot/subframe scheduling. FIG. 8 depicts a radio frame having 8 slots/subframes 1-8. In multi-slot scheduling, a control channel in one slot schedules data channels in multiple slots. In a first example, in slot/subframe 1, a serving base station transmits basic DCI 811 to a UE to schedule data channels in 4 slots/subframes. Basic DCI 811 is associated with extended DCI 812 in slot 1 and extended DCI 832 in slot 3. The basic DCI 811 provides basic scheduling information for scheduled data channels 813, 823, 833, and 843 in slot 1, 2, 3, 4, respectively. The extended DCI 812 provides extended scheduling information for the scheduled data channels 813 and 823 in slot 1 and slot 2. The extended DCI 832 provides extended scheduling information for the scheduled data channels 833 and 843 in slot 3 and slot 4.

In a second example, in slot/subframe 5, the base station transmits basic DCI 851 to the UE to schedule data channels in 2 slots/subframes. Basic DCI 851 is associated with extended DCI 852 in slot 5 and extended DCI 862 in slot 6. The basic DCI 851 provides basic scheduling information for scheduled data channels 853 and 863 in slot 5 and 6, respectively. The extended DCI 852 provides extended scheduling information for the scheduled data channel 853 in slot 5. The extended DCI 862 provides extended scheduling information for the scheduled data channel 863 in slot 6.

In a third example, in slot/subframe 7, the base station transmits basic DCI 871 to the UE to schedule data channels in 2 slots/subframes. Basic DCI 871 is associated with extended DCI 872 in slot 7. The basic DCI 871 provides basic scheduling information for scheduled data channels 873 and 883 in slot 7 and 8, respectively. The extended DCI 872 provides extended scheduling information for the scheduled data channels 873 and 883 in slot 7 and slot 8. The number of slots or subframes to be scheduled in the multi-slot/subframe scheduling can be semi-statically configured by higher layer, or can be dynamically indicated by the basic DCI, e.g., using 2 bits in the basic DCI to indicate up to 4 slots/subframes. The extended DCI can still be used to change wideband or subband MCS in each slot/subframe.

Figure 9:
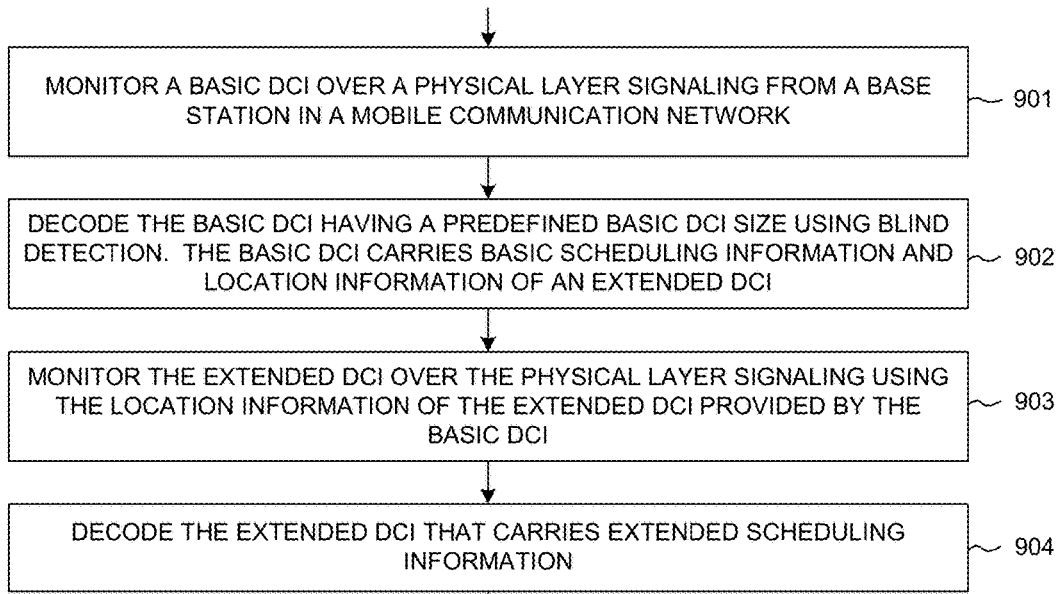
FIG. 9 is a flow chart of a method of two-stage scheduling in downlink control channel from UE perspective in accordance with one novel aspect.

FIG. 9 is a flow chart of a method of two-stage scheduling in downlink control channel from UE perspective in accordance with one novel aspect. In step 901, a user equipment (UE) monitors a basic downlink control information (DCI) over a physical layer signaling from a base station in a mobile communication network. In step 902, the UE decodes the basic DCI having a predefined basic DCI size using blind detection. The basic DCI carries basic scheduling information and location information of an extended DCI. In step 903, the UE monitors the extended DCI over the physical layer signaling using the location information of the extended DCI provided by the basic DCI. In step 904, the UE decodes the extended DCI. The extended DCI carries extended scheduling information.

Figure 10:
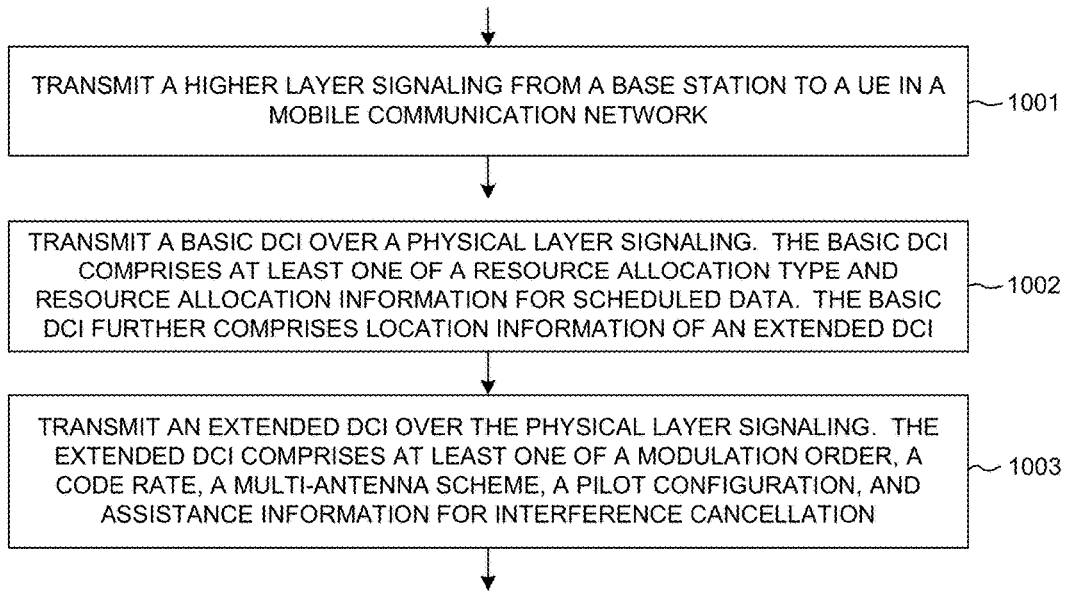
FIG. 10 is a flow chart of a method of two-stage scheduling in downlink control channel from eNB perspective in accordance with one novel aspect.

FIG. 10 is a flow chart of a method of two-stage scheduling in downlink control channel from eNB perspective in accordance with one novel aspect. In step 1001, the base station transmits a higher layer signaling to a user equipment (UE) in a mobile communication network. In step 1002, the base station transmits a basic downlink control information (DCI) over a physical layer signaling. The basic DCI comprises at least one of a resource allocation type and resource allocation information for scheduled data. The basic DCI further comprises location information of an extended DCI. In step 1003, the base station transmits an extended DCI over the physical layer signaling. The extended DCI comprises at least one of a modulation order, a code rate, a multi-antenna scheme, a pilot configuration, and assistance information for interference cancellation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
monitoring a basic downlink control information (DCI) over a physical layer signaling from a base station by a user equipment (UE) in a mobile communication network;
decoding the basic DCI having a predefined basic DCI size using blind detection, wherein the basic DCI carries basic scheduling information and location information of an extended DCI;
monitoring the extended DCI over the physical layer signaling using the location information of the extended DCI provided by the basic DCI; and
decoding the extended DCI, wherein the extended DCI carries extended scheduling information.

2. The method of claim 1, wherein the basic scheduling information comprises at least one of a resource allocation type and resource allocation information for scheduled data, and wherein the extended scheduling information comprises at least one of a modulation order, a code rate, a multi-antenna scheme, a pilot configuration, and assistance information for interference cancellation for the scheduled data.

3. The method of claim 1, wherein the UE monitors the basic DCI via a unicast signaling over a UE-specific search space.

4. The method of claim 1, wherein the UE monitors the basic DCI via a broadcast or multicast signaling over a common search space using a group scheduling identification.

5. The method of claim 4, wherein the UE receives a higher layer signaling for obtaining the group scheduling identification.

6. The method of claim 1, wherein the UE receives a higher layer signaling for determining an extended DCI size of the extended DCI.

7. The method of claim 1, wherein the basic DCI and the extended DCI are located inside a Physical Downlink Control Channel (PDCCH) region.

8. The method of claim 1, wherein the basic DCI is located inside a Physical Downlink Control Channel (PDCCH) region, and wherein the extended DCI is located inside a Physical Downlink Shared Channel (PDSCH) region.

9. A user equipment (UE), comprising:
a receiver that receives a basic downlink control information (DCI) over a physical layer signaling from a base station in a mobile communication network, wherein the receiver also receives an extended DCI over the physical layer signaling using location information of the extended DCI provided by the basic DCI; and
a decoder that decodes the basic DCI having a predefined basic DCI size using blind detection, wherein the basic DCI carries basic scheduling information and location information of the extended DCI, wherein the decoder also decodes the extended DCI, and wherein the extended DCI carries extended scheduling information for the scheduled data.

10. The UE of claim 9, wherein the basic scheduling information comprises at least one of a resource allocation type and resource allocation information for scheduled data, and wherein the extended scheduling information comprises at least one of a modulation order, a code rate, a multi-antenna scheme, a pilot configuration, and assistance information for interference cancellation.

11. The UE of claim 9, wherein the UE monitors the basic DCI via a unicast signaling over a UE-specific search space.

12. The UE of claim 9, wherein the UE monitors the basic DCI via a broadcast or multicast signaling over a common search space using a group scheduling identification.

13. The UE of claim 12, wherein the UE receives a higher layer signaling for obtaining the group scheduling identification.

14. The UE of claim 9, wherein the UE receives a higher layer signaling for determining an extended DCI size of the extended DCI.

15. The UE of claim 9, wherein the basic DCI and the extended DCI are located inside a Physical Downlink Control Channel (PDCCH) region.

16. The UE of claim 9, wherein the basic DCI is located inside a Physical Downlink Control Channel (PDCCH) region, and wherein the extended DCI is located inside a Physical Downlink Shared Channel (PDSCH) region.

17. A method comprising:
transmitting a higher layer signaling from a base station to a user equipment (UE) in a mobile communication network;
transmitting a basic downlink control information (DCI) over a physical layer signaling, wherein the basic DCI comprises at least one of a resource allocation type and resource allocation information for scheduled data, wherein the basic DCI further comprises location information of an extended DCI; and
transmitting the extended DCI over the physical layer signaling, wherein the extended DCI comprises at least one of a modulation order, a code rate, a multi-antenna scheme, a pilot configuration, and assistance information for interference cancellation.

18. The method of claim 17, wherein the base station transmits the basic DCI via a unicast signaling over a UE-specific search space.

19. The method of claim 17, wherein the base station transmits the basic DCI via a multicast or broadcast signaling over a common search space using a group scheduling identification.

20. The method of claim 19, wherein the higher layer signaling provides the group scheduling identification.

21. The method of claim 17, wherein the higher layer signaling configures the UE to apply cross-slot/subframe scheduling for the basic DCI.

22. The method of claim 17, wherein the higher layer signaling configures the UE to apply multi-slot/subframe scheduling for the basic DCI.

* * * * *